United States Patent [19]

Rizk et al.

[11] Patent Number: 5,514,285

[45] Date of Patent: May 7, 1996

[54] AERATION SYSTEM

[75] Inventors: Tony A. Rizk, Oliver Springs; Gary E. Hauser, Knoxville, both of Tenn.

[73] Assignee: Tennessee Valley Authority, Muscle Shoals, Ala.

[21] Appl. No.: 501,688

[22] Filed: Jul. 12, 1995

Related U.S. Application Data

[62] Division of Ser. No. 121,858, Sep. 17, 1993, Pat. No. 5,462,657.
[51] Int. Cl.[6] .................................................. C02F 3/24
[52] U.S. Cl. .......................... 210/739; 210/747; 210/758
[58] Field of Search .................................... 210/739, 746, 210/747, 758, 765, 766, 808, 805, 96.1, 170, 199, 255; 261/115–118

[56] References Cited

U.S. PATENT DOCUMENTS 3,945,918  3/1976  Kirk ...................................... 210/758
3,976,575  8/1976  Sullins ................................... 210/255
4,042,510  8/1977  Sullins ................................... 210/255
4,219,424  8/1980  Tamura et al. ........................ 210/255

*Primary Examiner*—Thomas G. Wyse
*Attorney, Agent, or Firm*—Robert A. Petrusek

[57]  ABSTRACT

New techniques and means for their utilization are described for substantially improving gas to liquid transfer including aeration of hydroelectric project tailwaters and treatment of sewage sludge and sewage treatment effluent or other wastewaters. Liquid flow is directed over an infuser device to separate the liquid into a plurality of free-falling curtains disposed to impinge upon a collection pool therebeneath wherein a substantial number of gas bubbles entrained by any particular curtain are acted upon by successive impingements of downstream curtains to effect turbulent interaction, shearing, and reentrainment of such bubbles and substantially increase the residence time thereof in the resulting recombined flow.

17 Claims, 5 Drawing Sheets

AERATION SYSTEM

The invention herein described may be manufactured and used by or for the Government for governmental purposes without the payment to us of any royalty therefor.

This application is a division of application Ser. No. 08/121,858, filed Sep. 17, 1993, U.S. Pat. No. 5,462,657.

INTRODUCTION

The present invention relates to a new, novel, relatively simple and inexpensive aeration apparatus, as well as to highly efficient and safe techniques or methods for utilization thereof to provide requisite water management either below certain hydroelectric power projects to achieve desired aeration and flow characteristics in the tailwaters therefrom, or alternatively in sewage or other wastewater treatment facilities to maximize aerobic activities therein. In regards to the first principal embodiment, it has long been appreciated that typical water quality concerns with releases from hydropower reservoirs include low dissolved oxygen, inappropriate temperature for downstream uses, supersaturation of total dissolved gases, and water quality constituents associated with low dissolved oxygen. Except for supersaturation of total dissolved gases, usually caused by by-passing turbines and spilling water, such concerns are related to the limnology of the upstream reservoir. Various limological factors affect the quality of water released through hydroturbines including the content of dissolved oxygen (DO) therein. Newly proposed hydroelectric developments and many of the almost 300 projects to be relicensed by the year 2000 must address the issue of DO in reservoir releases. Morphological factors as well as established flow regimes in various reservoirs interface with one another and are at least partially determinative of minimum flows downstream from such hydroprojects, which in turn also affect tailwater assimilative capacities and effective wetted channel areas whereby benthic organisms and standing crops, respectively, can be impacted.

One principal embodiment of the instant invention is concerned with improving water quality DO aspects by enhancing river basin operations through the installation and use of a reregulation and aeration weir of a new and improved design whereby the aeration characteristics and performance thereof are, under most conditions and situations, as beneficial as are realized from the utilization of labyrinth type weir technology, but which because of its improved design is substantially less expensive to build and install. Accordingly, it will be appreciated that the apparatus and technique of the instant invention provides for realization of the many advantages of a labyrinth type weir over in-plant aeration and minimum flow methods, including reliability, low operating and maintenance costs, longevity, good public image, safe hydraulic conditions, and accommodation for providing minimum flow without the concomitant disadvantages of relatively high capital investment and installation costs, impacts on power production, and cavitation concerns associated with in-plant aeration methods.

Another principal embodiment of the instant invention is concerned with effectively and efficiently improving the environment in sewage or other wastewaters by maximizing aerobic activities therein through the utilization of passive aeration techniques thereby affecting substantial savings in energy normally expended through maintenance of a myriad of operating spray heads.

BACKGROUND OF THE INVENTION

1. Field of the Invention

The concentration of DO in water has long been a significant concern in water quality management and certain minimum levels thereof are necessary for aquatic biological systems and for either separate treatment of or concurrent assimilation of treated municipal and industrial wastewaters. In short, DO is an important measure of the general quality of surface waters.

With respect to the first principal embodiment of the instant invention as it relates to a new and improved passive aeration device for tailwater management, it is well recognized that all impoundments affect DO. DO reductions in some reservoirs may not be severe enough to affect aquatic life, while in others, significant DO reductions seasonally lead to releases low in DO. In still other reservoirs, reductions intermittently lead to releases low in DO.

Many factors affect DO. Identification of these for each reservoir permits cost-effective mitigative measures. Recognition of DO patterns can help in assessing potential for other undesirable water quality that may result from low DO. For example, hydrogen sulfide sometimes associated with very low DO concentrations can be toxic to aquatic life. Iron and manganese sometimes associated with low DO can consume DO added by aeration systems, contribute to slime growths in turbine systems, and cause staining in water supplies.

It will be appreciated that DO concentrations at any time or location are the result of a delicate balance of oxygen-producing and oxygen-consuming processes. Contact with the atmosphere and photosynthesis by aquatic plants are natural sources of oxygen. The atmosphere is generally the most significant source. In conjunction with water temperature, atmospheric pressure determines the saturation concentration of DO in fresh water. Whenever DO is less than the saturation level, oxygen is absorbed from the atmosphere. Although the atmosphere usually serves as a source of oxygen, it also serves as a "sink" when DO is supersaturated.

Oxygen-consuming processes include 1) decomposition of dissolved, suspended, and settled organic matter from municipal and industrial wastewaters, natural and manmade nonpoint sources, and dead aquatic plants; 2) aquatic plant respiration; and 3) nitrification (oxidation of ammonia and nitrite to nitrates).

The balance between natural production and consumption of DO depends on temperature (affects the saturation DO level and rates of various biological processes); contact between water and the atmosphere (depends on hydraulic characteristics such as turbulent mixing and density currents); morphology and substrate characteristics; nutrient availability for aquatic plants; meteorology (especially wind speed, temperature, pressure, and solar radiation); and toxicants (which can suppress microorganisms involved in consumption processes and photosynthesis).

The effects of various reservoir characteristics on DO can be described generally, and DO levels that can be expected in releases from different types of projects can be estimated. However, the only way to quantify DO levels at specific projects is to use site-specific data, often employing a mathematical water quality model.

For a more detailed and definitive treatment of factors affecting water quality in the releases from hydropower reservoirs including 1) the effects of DO on thermal stratification in storage, transitional, and mainstream reservoirs, 2) the effects of environmental processes by both longitudinal zones and thermal layers, and 3) the effects of sulfide, iron, and manganese constituents in certain reservoir waters see Ruane, Richard J., and Hauser, Gary E., "Factors Affecting Water Quality in the Releases from Hydropower Reservoirs," Proceedings of the 52nd American Power Conference, Illinois Institute of Technology, Chicago, 1990. In addition, more specific details of developments and measures which have been implemented by the assignee of the instant invention to increase minimum flows below selected hydropower projects and to improve DO contents of releases therefrom can be found in "Improving Reservoir Releases," Tennessee Valley Authority, TVA/ONRED/AWR 87/33, Knoxville, Tenn., 1987. For purposes of teaching, disclosing, and claiming the instant invention, the teachings and disclosure of both references, supra, i.e. Ruane and TVA, respectively, are hereby incorporated herein by reference thereto.

Although a major thrust of the instant invention is directed to enhancing water quality downstream of hydroprojects by increasing the DO content thereof, this particular embodiment necessarily must also be concerned with and directed to providing requisite minimum flows in river/tributary streams. Accordingly, the remainder of this section is intended as an abbreviated overview of some of the methods investigated and/or utilized for providing such minimum flows.

Turbine Pulsing: Turbine pulsing refers to operation of an existing turbine at a hydropower dam for a short duration at regular intervals. The objective of such pulsing scheme is to maintain a minimum flow higher than hydroproject leakage whenever the turbines would not otherwise be generating, such as at night, on weekends, during filling of the reservoirs, or during flood protection operation for downstream reservoirs. In the immediate tailrace, turbine pulsing causes flow fluctuations between a minimum that represents leakage rate and a maximum of one turbine discharge. A mile or so downstream, the minimum flow observed is greater than the leakage value and the maximum is substantially less than the one turbine value. Farther downstream, the fluctuations continue to dampen so that the minimum and maximum flows approach the temporal mean flow.

Unsteady flow modeling studies of several tailwaters have shown that pulsing with existing turbines can provide an essentially constant flow within a few miles downstream of many projects using a proper combination of pulse flow, duration, and interval. The pulsing flow used is typically the most efficient discharge for the smallest turbine at the project; the pulse duration typically ranges from 15 minutes to 1 hour; and the interval between pulse starts is typically 2 to 6 hours for a tailwater with no reregulation weir, and 8 to 24 hours for a tailwater with a reregulation weir.

Reregulation Weirs: The main objective of a reregulation weir is to sustain an increase in minimum flow between generating periods by discharging stored water slowly after periodic refill from the upstream dam. The pools behind these weirs normally have enough storage to maintain target minimum flows for 8 to 12 hours before they need to be refilled by releases from the upstream dam. The weirs are overtopped quickly during generation and do not provide any significant reduction of peak discharge.

Reregulation weirs are low head dams usually less than about 12 feet high with low level releases (usually submerged pipes) located in the first few miles downstream from a major hydroproject. Weirs may be constructed of concrete but use of porous media with an impermeable liner has decided benefits for reducing dangerous flow conditions at the weir. Releases from reregulation weirs are by overtopping and open pipe flow (during generation) and by valve and pipe flow (off generation). Weir height and location are designed to maximize the length of tailwater where minimum flow is sustained (i.e., downstream of the weir); provide adequate storage volume to sustain a minimum flow and minimize refill frequency; and minimize the increase in backwater on the upstream turbine.

Float-actuated valves in low level pipes through the weirs have been shown to provide fairly constant flow as the weir pool drains. Such arrangements provide drain time durations of from 2 to 3 times that possible with unvalved pipes. Minimum flows are maintained at a fairly constant rate (up to 20% deviation from target minimum flow rate) below the weir except for increase in flow due to overtopping during the refill cycle. It is normal practice to surcharge the weir pool and overtop the weir with each pulse to maximize the water stored in the channel above the weir. This can add as much as an hour to flat pool drain times.

A power loss cost is associated with use of weirs due to the need to refill when turbines would not otherwise be used, such as off-peak hours, weekends, and during spring filling of the reservoirs. Weirs can reduce the required frequency of pulsing on tailwaters where the design objectives described previously can be achieved.

Small Turbine Addition: A small turbine can be sized to provide the target flow rate continuously between periods of normal hydrogeneration. The small unit discharge is normally only a small fraction of the capacity of larger units designed for the sole purpose of hydrogeneration. Small units are usually not as efficient as the large units, and are usually run constantly. Thus, even though power is being generated with the small unit, a power loss cost is still incurred due to reduced efficiency and off-peak use. Small units are not always technically feasible because they require a convenient access to impounded water and an outlet designed to pass the target minimum flow. Costs vary from site to site, but small unit additions tend to be more expensive than turbine pulsing and weir options.

Sluicing/Spilling: Release of water through sluice gates or over gated spillways is sometimes used to provide emergency flows downstream. However, sluicing and spilling have such high power loss costs that they are not usually considered for routine minimum flow maintenance. Like the small unit, these methods can provide more or less constant flows. However, existing systems are not normally designed for low discharges, so it is often difficult to regulate the flows down to target levels without outlet modifications. Operational problems such as cavitation may also develop.

2. Description of the Prior Art

Historically, weirs have been built to regulate water supplies. Water flowing over a weir drags air in its wake as it plunges into the pool downstream therefrom. Gameson reported weirs are good aerators. (Gameson, A. L. H., "Weirs and the Aeration of Rivers", *J. Inst. of Water Engineers.*, 11:477–490, 1957.) Water falling over weirs can gain approximately 1 mg/L of DO for every foot of fall height. With interest in aerating weirs on the rise, major contributions subsequently were made by Avery, Sean and Novak, Payel, "Oxygen Transfer at Hydraulic Structures," *J. of the Hydraulics Division*, ASCE, 104 (HY11):1521–1540 (November 1978); Markovsky, M. and Kobus H., "Unified Presentation of Weir Aeration Data", *J. of the Hydraulics Division*, ASCE, 104 (HY4):562–568, April 1978; and, Nakasone, H., "Study of Aeration of Weirs and Cascades",

*J. of Env. Eng.*, 113 (1):64–81 (February 1987), among others.

The simplest weir design is a straight weir normal to flow in the river channel. Unfortunately, with this simple design aeration performance and safety are decreased as flow rate thereover increases. Previous studies have determined that optimal aeration occurs at 0.7 cfs/ft (Nakasone, supra) and unsafe hydraulic conditions occur at flow rates higher than 1.5 to 2.0 cfs/ft with 3 to 4 feet drop heights into deep plunge pools [Leutheusser, H. J., and Brink, W. M., "Downproofing of Low Overflow Structures," *J. Hydr. Eng.*, Vol. 117, No. 2, pp. 205–213 (February 1991)]; [Hauser, G., "Full Scale Physical Modeling of Plunge Pool Hydraulics Downstream of a Vertical Weir", TVA Report WR28-1-590-153 (May 1991)]. These safety considerations have been instrumental in the decision process which led the assignee of the present invention to build a labyrinth aerating weir at its South Holston tailwater, since such type of weir can be designed to effect low specific discharge rates. Although aeration performance can be improved dramatically, and dangerous hydraulic jumps eliminated, the installation of a labyrinth weir represents and requires considerable initial capital investment. Accordingly, in situations wherein only the regulation of water supply and maintenance of minimum flow is the primary consideration such a relatively expensive approach is not required. Thus both types of weir design (straight and labyrinth) may have important characteristics for consideration depending on the design requirements for a given situs.

With these factors in mind, the assignee of the present invention developed its own functional design for its so-called timber crib weir which has been determined to be safe and effective for improved minimum flow below hydropower dams between generating periods thereof. Another distinct functional design developed and tested by said assignee has been one of the labyrinth weir type for enhancing both minimum flow and aeration. One driving force for investigating the design, costs, installation and operating characteristics of the labyrinth type aerating weir has been the results of a fairly recent analyses of the relationship between benthic communities and DO at well over a dozen tailwaters over the Tennessee Valley which analyses demonstrated that there was a statistically significant, direct correlation between measures of benthic community health and DO concentrations in such tailwaters. Although improvements were fairly linear between substantially no measurable DO and about 7 mg/L of DO in water tested, there was shown to be a dramatic shift from benthic communities dominated by organisms tolerant of low DO to more diverse communities, including those intolerant of low DO at a DO level of about 4 mg/L.

With both the timber crib weir and the labyrinth type weir design, supra, a target minimum flow is sustained by slow drainage of the weir pool between periodic refills. With the labyrinth weir, aeration occurs during generation via overtopping. Both weirs are designed to maximize the value of the tailwater while minimizing backwater on the upstream turbine, unsafe hydraulic conditions, and environmental disturbance.

Design steps common to both weirs included selecting a target minimum flow, determining weir height and location, and configuring low-level pipes and valves for flow control.

Target minimum flows were selected in a tradeoff evaluation that considers 1) visual observation of flow tests; 2) modeled incremental physical changes with increased flow; 3) professional judgment of aquatic benefits; and 4) assessment of impacts to recreation, upstream reservoir pools, and annual power production. Resulting minimum flow targets ranged from 50% to 100% of the unregulated 7-day 10-year low flow. Physical changes resulting from such minimum flows vary widely across tailwaters. Depth increases of several tenths of a foot and wetted area increases of 25% to 65% in riffles are common, relative to leakage conditions.

The weir impoundment must have enough storage capacity to achieve desired drain times with a reasonable weir height. Ideally, a weir pool should require only one refill per day (24 hour drain time) so that a single refill pulse can be scheduled during peak power demands. However, in the Tennessee Valley River basin this would require weirs 10 to 15 feet high, thereby creating concerns about upstream flooding. Weir heights in the more typical 5 to 10 feet range require two or three refills per day (8 to 12 hours drain time) forcing at least one off-peak refill. For weirs with 12 to 24 hours of drain time, two refill pulses can sometimes be placed on the "shoulders" of the peak demand period, reducing off-peak costs. To maximize channel storage upstream of the weir, the weir pool can be surcharged to slightly overtop the weir at each refill and add as much as an hour to flat pool drain times. Weirs should be located near the upstream dam to maximize the length of improved tailwater (downstream of the weir), but they must not add to backwater on the turbines. A location within the first 3 miles below the powerhouse is normal. Also to be avoided are sites downstream from tributaries with poor water quality and sites requiring major dewatering during construction. Land for the weir, its maximum pool, and construction staging areas must be acquired.

Other design considerations included low-level pipes and float-actuated butterfly valves [Loiseau, et al., "Modeling and Verification of the Clinch River Weir," TVA Engineering Laboratory, Norris, Tenn. (1983)], which can be installed to maintain and prolong the minimum flow between generating periods. The bunterfly valves, connected by hinged arms to a Styrofoam float, act in conjunction with unvalved pipes to provide constant flow by opening gradually as the weir pool drops. Both 12-inch and 18-inch diameter pipes have been used. Use of few large diameter pipes rather than numerous small diameter ones can reduce costs in material, float and valve manufacture, installation, and maintenance. Pipes should be oversized or extra pipes added and capped to provide reserve capacity. Oversized segments can be installed in the weir with smaller segments attached upstream. Accordingly, the diameter of the attached pipes can be changed, and maximum discharge capacity is limited only by the large pipe segments.

As noted above, when the primary design consideration is only for minimum flow, the preferred design is a timber crib weir with pipes and valves as described above. The timber crib is rock-filled with heavy steel grating over the fill. An impermeable membrane at the upstream weir face prevents throughflow.

Improper weir design will produce a downstream hydraulic jump or "keeper" that can trap small boats or swimmers. These conditions are avoided by building a wide (upstream to downstream), porous structure which steps or slopes down gradually to the doornstream face. Some flow moves through the weir and exits near the stream bed, dissipating energy along the overflow path, rather than all at once in a turbulent hydraulic jump. This design has evolved from physical modeling and prototype testing. Flow conditions are sensitive to parameters such as tailwater elevation. Thus, site-specific physical modeling and shaping is recommended [Loiseau, et al., "Modeling and Verification of the Clinch River Weir," TVA Engineering Laboratory, Norris, Tenn. (1983)].

The Norris crib weir has successfully maintained minimum flows (200 cfs for 12 hours between refills) since 1984 without major impact on Norris Dam operations. Trout fishing activities in the tailwater accelerated after weir completion, and in September 1988, the state record brown trout (28 lbs, 12 oz) was caught just below this weir.

As noted above, when the weir design considerations must address both minimum flow and aeration, the prior art preferred design is a labyrinth weir. This weir design has an extended crest length to reduce unit discharge during overtopping. In this manner, this design decreases the intensity of the plunge pool roller and improves aeration. Aerating weir design considerations focus on proper crest length and labyrinth shape. The crest length selected must result in a unit discharge low enough to produce safe plunge pool conditions and still result in effective aeration. Unit discharges of 7 cfs/ft over low head weirs have resulted in fatal rollers, while unit discharges of 0.5 cfs/ft create thin sheets of water with trivial downstream recirculation. A range of unit discharges from 0.5 to 3.5 cfs/ft was tested full scale during design of the South Holston labyrinth weir (Hauser, 1991). Plunge pool hydraulics below a vertical weir segment were measured and observed by walking and swimming in the recirculation zones with safety gear. Results suggested 2 cfs/ft as a threshold above which flow conditions become mildly troublesome to free swimmers. The South Holston weir (2100 ft overflow length) was designed to operate at 1.2 cfs/ft during normal turbine operation and about 2 cfs/ft during flood operation (less than 1% of the time). Plunge pool depths will average 3 feet with a maximum of 4.5 feet to allow an adult person to walk instead of swim for self-rescue or rescue of small children.

Aeration is achieved primarily by bubbles entrained as the overflow nappe impinges on the plunge pool. Aeration efficiency is affected by drop height, unit discharge, plunge pool depth, and oxygen deficit (Nakasone, supra). Additional aeration occurs down the length of the labyrinth legs due to reentrainment of bubbles along the flow path. Based on preliminary testing, the South Holston weir should increase DO by over 4 mg/L when upstream DO is 3 mg/L and unit discharge is 1.2 cfs/ft, with a 4.5 feet fall height (headwater to tailwater).

The labyrinth shape must be planned after the crest length is determined. The labyrinth must fit reasonably within the river channel, provide good bubble zones, and achieve uniform overflow conditions all along the weir crest. Weir segments normal to river flow are designed to be non-overflow to avoid nappe convergence in corners which might increase recirculation intensity. To avoid long labyrinth legs, numerous bays are desirable. However, the number of bays is limited by the channel width and the bay width needed for full development of bubble zones along the sides of each labyrinth bay. Non-overflow segments should be minimized to reduce costs. Crest length and these shape constraints determine bay length and leg angle. Water surface profiles in headwater bays need to be computed to check for nonuniform overflow conditions which might produce dangerous hydraulics along the weir.

Specifications for the South Holston labyrinth weir call for concrete and wood with weir walls being pressure-treated, tongue-and-groove wood members placed horizontally atop lower members and supported by reinforced concrete piers anchored into bedrock. Piers are designed to be slotted vertically to receive wall members in a stoplog arrangement. Intermediate concrete buttresses at midpoints between the slotted piers are included to support lower wood members. A concrete leveling pad between each slotted pier follows the channel bottom beneath the weir wall. Slotted piers include Tee (T) pipes to ventilate behind the nappe. Pipes and valves like the timber crib weir are included for minimum flow control.

Advantages of both weir designs, supra, are evidenced in hydraulic and aeration performance, weir safety, and ease of construction. The pipe and valve assembly is a proven low maintenance way to regulate flow. The porous timber crib eliminates dangerous hydraulics, and is easily constructed with inexpensive materials. Overflow conditions are navigable without danger. Disadvantages of weirs like the timber crib are that it is attractive to the public as a fishing pier in a location of rapidly varying water levels, in spite of efforts to prohibit such use and, of course, it is useful only for effecting minimum flow. However, if this is the suggested design criteria, then cost-effectiveness of a timber crib weir for maintenance of said minimum flow rivals that of turbine pulsing and usually exceeds that of small turbine additions or turbine bypass options.

The labyrinth weir design achieves both minimum flow and aeration objectives within a single structure and therefore is considerably more versatile than the crib weir, supra. With this design both aeration and safety increase as the crest is lengthened. Aeration is passive, so all releases from the upstream dam are aerated, regardless of origin. Aeration is downstream of the hydroplant, avoiding efficiency losses and cavitation problems of in-plant, turbine intrusive methods. Extended crests efficiently pass flows with less inundation and head loss on the upstream turbine than with straight weirs. The labyrinth weir cannot be used as a fishing pier and, accordingly does not present a structure having this undesirable public attraction characteristic. Disadvantages of the labyrinth weir are that it is non-navigable, it requires excessive crest length to safely aerate high flow applications, it reduces fish passage, and although aerating weir costs are equivalent to certain combinations of other methods for minimum flow and DO improvement, this design requires considerable capital investment due to the high costs associated with construction.

It should now be appreciated that the prior art relating to the design of weirs, for providing both control of minimum tailwater flow and aeration thereof required a new initiative wherein the restrictive disadvantages heretofore encountered can be simply and inexpensively overcome. This need for substantial improvement in this area is further appreciated when other alternatives for maintaining minimum flow and providing requisite aeration in tailwaters are considered, including headwater reservoir modifications with diffusers (forebay, trashracks, or penstocks), or active destratification means (forced air or water circulation) or a plethora of retrofit turbine/draft tube modifications (hub baffles, turbine runners, draft tube rings, and head cover injectors).

SUMMARY OF THE INVENTION

The instant invention relates to a new, novel, and relatively simple and inexpensive passive aeration apparatus, as well as highly efficient and safe techniques or methods for utilization thereof to provide requisite water management either below certain hydropower projects to achieve desired flow characteristics and aeration therefrom, or alternatively in aeration of sewage or other water treatment processes. The instant new device represents a passive aeration approach and is embodied in a relatively compact highly cost-effective apparatus easily tailored and customized to specific hydropower tailwater situses or sewage wastewater facilities. It has principally been observed to provide substantial increases in DO content of oxygen-depleted reservoir releases, wherein is realized therefrom tailwaters easily containing 4–6 mg/L of DO when reservoir releases are 0–2 mg/L of DO. The instant device and technique for operation thereof represents a substantial departure from prior art approaches wherein the profile of weir nappes heretofore configured as naturally free-falling waterfalls have been substantially reconfigured both in profile and occurrence. The prior art profile configuration of a free-falling waterfall, for example, illustrated in both Nakasone, supra, and Hauser, WR28-1-590-153, supra, is changed by means of the instant apparatus to a profile having a series of turbulent, vertical or inclined jets. The long, single nappes of the prior art devices have been substantially rearranged to now result in a series of falling curtains normal to stream flow and sequenced in a direction downstream in the instant device. In the most preferred embodiment and arrangement of the instant apparatus, the sequencing of vertically directed liquid fall or falling curtains is further modified with increasing curtain thickness longitudinally in the direction of the apparatus tailwater. The term "directed liquid fall" as used herein means a generally free-falling curtain of liquid including water resulting from the flow of such liquid over a top surface of a defined space, wherein said top surface is provided with at least one aperture in the form of a slot therein and with the greatest dimension of said slot being generally normal to the flow of liquid over such top surface so that only a portion of said flow thereover is diverted for entry into said aperture to thereby form a resulting falling curtain of liquid therethrough. It is to be understood that the resulting falling curtain or directed liquid fall, as the terms are herein used oftentimes interchangeably, differs in profile from the natural curvature of an unrestricted waterfall nappe of the type often illustrated resulting from overflow of weirs. With operation of the new instant apparatus, it has been discovered that frothing within the plunge pool operatively associated therewith is much more highly effected thereby evidencing proportionally larger concentrations of bubbles than are normally observed with plunge-pool dynamics resulting from laminar nappes associated with weirs of prior art design. Indeed, it has been observed and documented that the succession of modified nappes resulting from the instant device results in a certain multiplying effect wherein the impingement of the nappe or now perhaps more accurately, falling curtain with the plunge pool and the normal entrainment of bubbles therefrom, particularly downstream from the point of impingement, is acted upon by impingement of the next curtain so as to force reentrainment of such bubbles, break up coalescing bubbles, and prevent their rise to the surface for a time sufficient to effect enhanced gas-liquid interface transfer. Accordingly, one significant advantage realized through utilization of the instant apparatus design is to cause substantially increased time of entrainment of small bubbles in a highly turbulent flow field, thereby substantially increasing oxygen transfer to the water treated thereby. Another significant advantage realized through operation of the instant apparatus is the fact that the maximum allowable flow rate above which unsafe hydraulic conditions occur has been increased from 2.0 cfs/ft reported with prior art, to over 13 cfs/ft.

In operation of the device of the instant invention, liquid flow is directed over an infuser device to separate the liquid into a plurality of free-falling curtains disposed to impinge upon a collection pool therebeneath wherein a substantial number of gas bubbles entrained by any particular curtain are acted upon by successive impingements of downstream curtains to effect reentrainment of such bubbles and substantially increase the residence time thereof in the resulting recombined flow stream. A principal advantage of the instant invention is that it can be economically installed at sites, which are limited in terms of channel width, available drop height, and plunge pool size; particularly, in existing chemical processes and water treatment plants or by the morphology of river basins.

OBJECTS OF THE INVENTION

It is therefore the principal object of the present invention to develop a new system, method, and means for easily, effectively, safely, and efficiently effecting enhanced water management, particularly in terms of increasing DO concentrations therein.

A further object of the present invention is to develop a new system, method, and means for effecting enhanced water management, particularly in terms of maintaining increased DO concentrations therein, wherein the tailwater embodiment thereof, benthic communities associated therewith can be and are dominated by organisms intolerant of low dissolved oxygen levels and in the wastewater treatment embodiment thereof wherein aerobic activities can be economically expedited.

Another object of the present invention is to develop a new system, method, and means for easily and efficiently effecting enhanced water management, particularly in terms of maintaining DO concentrations at threshold amounts therein, wherein benthic communities associated therewith can be and are dominated by organisms intolerant of low dissolved oxygen levels; and, wherein the minimum flow characteristics in such tailwaters are maintained to maximize wetted channel areas.

Still a further object of the present invention is to develop a new system for effecting enhanced tailwater management, particularly in terms of increasing DO concentrations therein, wherein undesired and unsafe hydraulic conditions, particularly those related to submerged hydraulic jumps and dangerous eddy currents resulting therefrom are substantially eliminated immediately in the stream area of the instant invention.

Still a further object of the present invention is to develop a new system, method, and means for easily and efficiently effecting enhanced tailwater management, particularly in terms of maintaining DO concentrations therein, at least to predetermined threshold amounts, wherein the development of certain benthic communities associated therewith can be and are positively affected by increased dissolved oxygen levels; wherein the minimum flow characteristics in such tailwaters are maintained to maximize wetted channel areas; wherein undesired and unsafe hydraulic conditions, particularly those related to hydraulic jumps and dangerous eddy currents or undertows resulting therefrom are substantially eliminated; and, wherein the degree of enhanced aeration is realized from the unilization of a device relatively compact in size, relatively inexpensive to design, install, and maintain, and further characterized as having an aesthetic public image.

BRIEF DESCRIPTION OF THE DRAWINGS

The present invention will be better understood from a consideration of the following description taken in connection with the accompanying drawings in which.

DETAILED DESCRIPTION OF THE DRAWINGS

Figure 1:
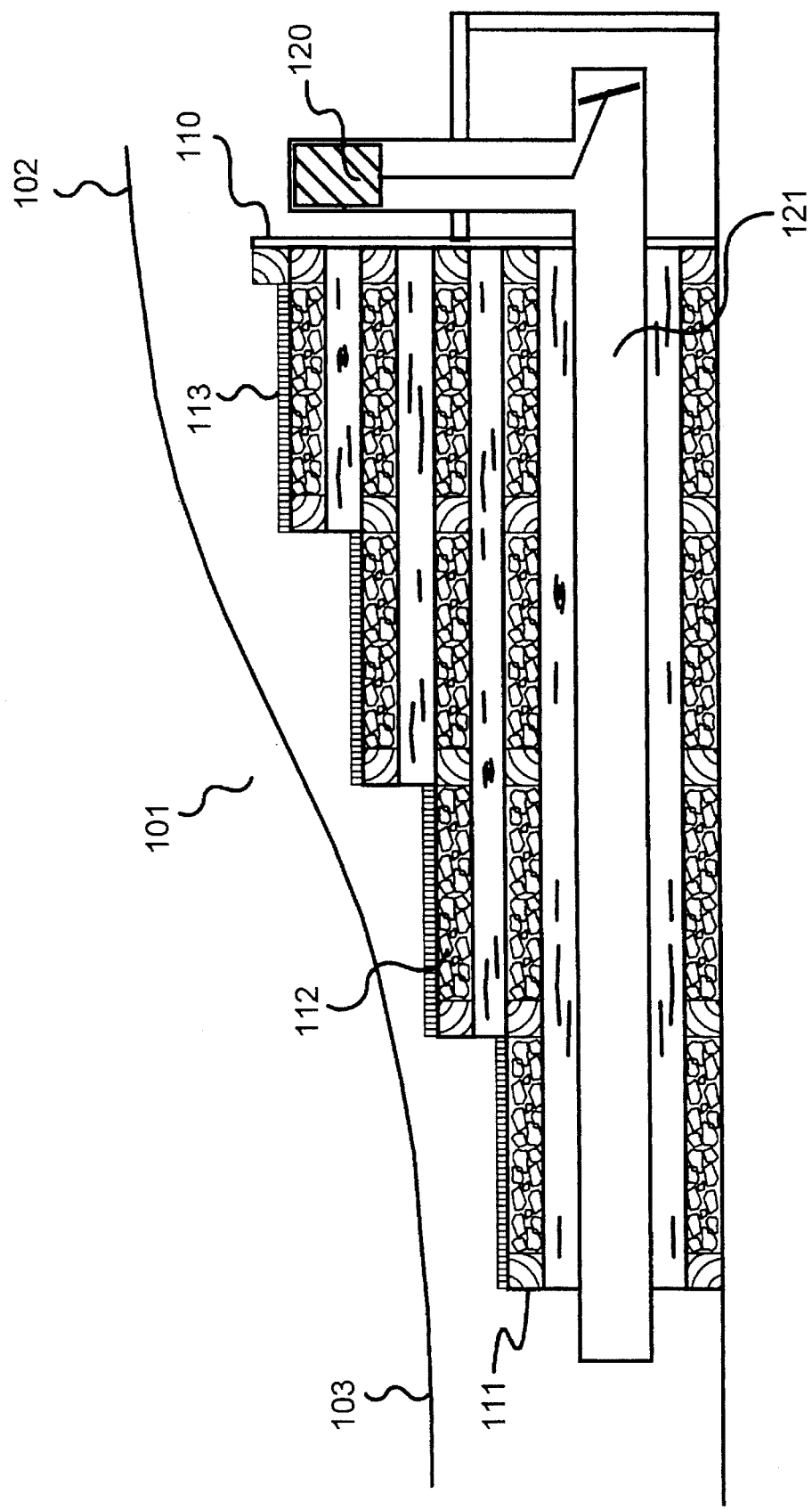
FIG. 1 is a side elevational view of a timber crib weir constructed according to the parameters developed in investigations conducted by personnel of the assignee of the present invention. For convenience, only the more salient features thereof are illustrated.
Figure 2:
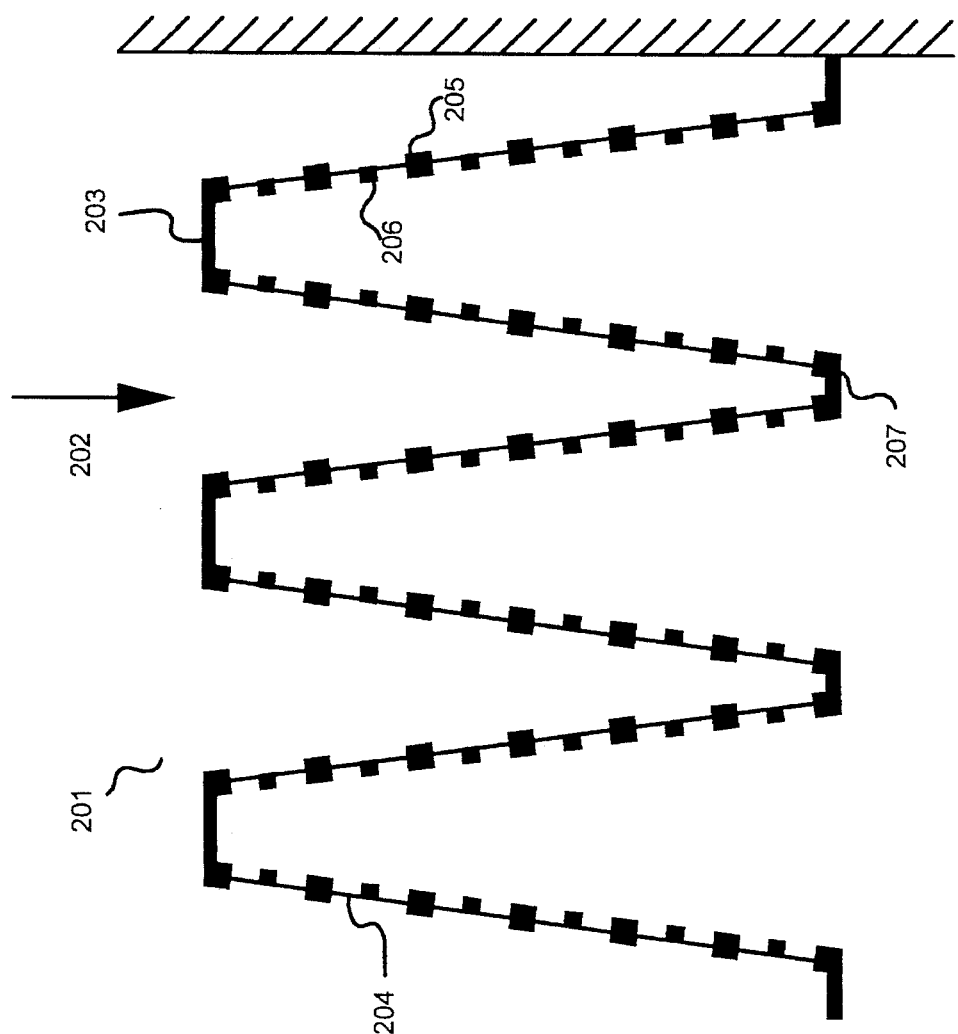
FIG. 2 is a top view of a three-bay portion of a labyrinth weir illustrating for convenience only the more salient features thereof.

Referring now more specifically to FIGS. 1 and 2, the specific details regarding the construction and operation of the reregulation timber crib weir (FIG. 1) and the reregulation/aeration three-bay labyrinth weir (FIG. 2) are given in Hauser, et al., "Innovative Reregulation Weirs for Dam Releases," Tennessee Valley Authority. For purposes of teaching, disclosing, and claiming the instant invention, the teachings and disclosure of said reference, supra, are herewith and hereby incorporated herein by reference thereto.

FIG. 1 shows in side elevational view the preferred timber crib weir design generally illustrated at 101 with a profile of the water surface under typical generating conditions, extending from the weir headwater elevation at 102 to the weir tailwater elevation at 103. Upstream face 110 of weir 101 generally comprises the impermeable surface which creates, in the vernacular of this art, the weir headwater shown at 102 which is also the tailwater of the upstream hydroproject (not shown). The materials of construction for upstream face 110 can be from any of a number of sources including marine plywood or vinyl membranes. With weir 101 being of the crib type, pressure treated timbers preferably 6"×6" in cross section and various lengths, as generally illustrated at 111, can be utilized. The resulting interconnected cribs, shown herein as four, can be filled with rock to give enough mass to secure same in place as illustrated at 112. The top of each of the four cribs may be overlaid with a smoothing surface herein shown typically at 113 as a grating. It will be further understood, that typical water surface profile from 102 to 103 is for overflowing conditions, such as when turbines in the hydroproject (not shown) upstream of weir 101 are engaged in the production of electricity and water is being discharged therethrough. In the mode shown herein, it will be appreciated that the water elevation will vary from the headwater at 102 downwardly along the downstream face to the tailwater elevation at 103. To facilitate maintenance of minimum flow between refills of the impoundment effected by the weir, any number of convenient valving systems may be utilized, herein shown for convenience as float 120 in operative association with conduit 121 which, as illustrated, discharges downstream of the weir. In this embodiment of the design, the vertical stepping between the four platforms of the weir is conveniently fabricated at 1.0 feet.

Referring now more specifically to FIG. 2, in the labyrinth weir generally shown therein at 201, it should be appreciated that the normal stream flow is in the vector direction generally illustrated at 202 with the upstream portions of the three bays one of which is shown as, for instance, at 203 and having an elevation generally greater than the side walls between the bays, one of such side walls being illustrated for convenience at 204. Walls are structurally supported by piers one of which is shown for convenience at 205 and mid-span supports one of which is shown at 206. Piers 205 in such side walls and downstream bay walls 207 may conveniently reach the same or approximate elevation as upstream bay wall 203, supra. In this manner water flowing over such side walls are not interfered with by cross flow over such upstream bay walls. It will, of course, be appreciated that the effective crest length of this labyrinth type weir is not limited to the width of the stream channel as is the case with the crib weir in FIG. 1, supra.

Figure 3:
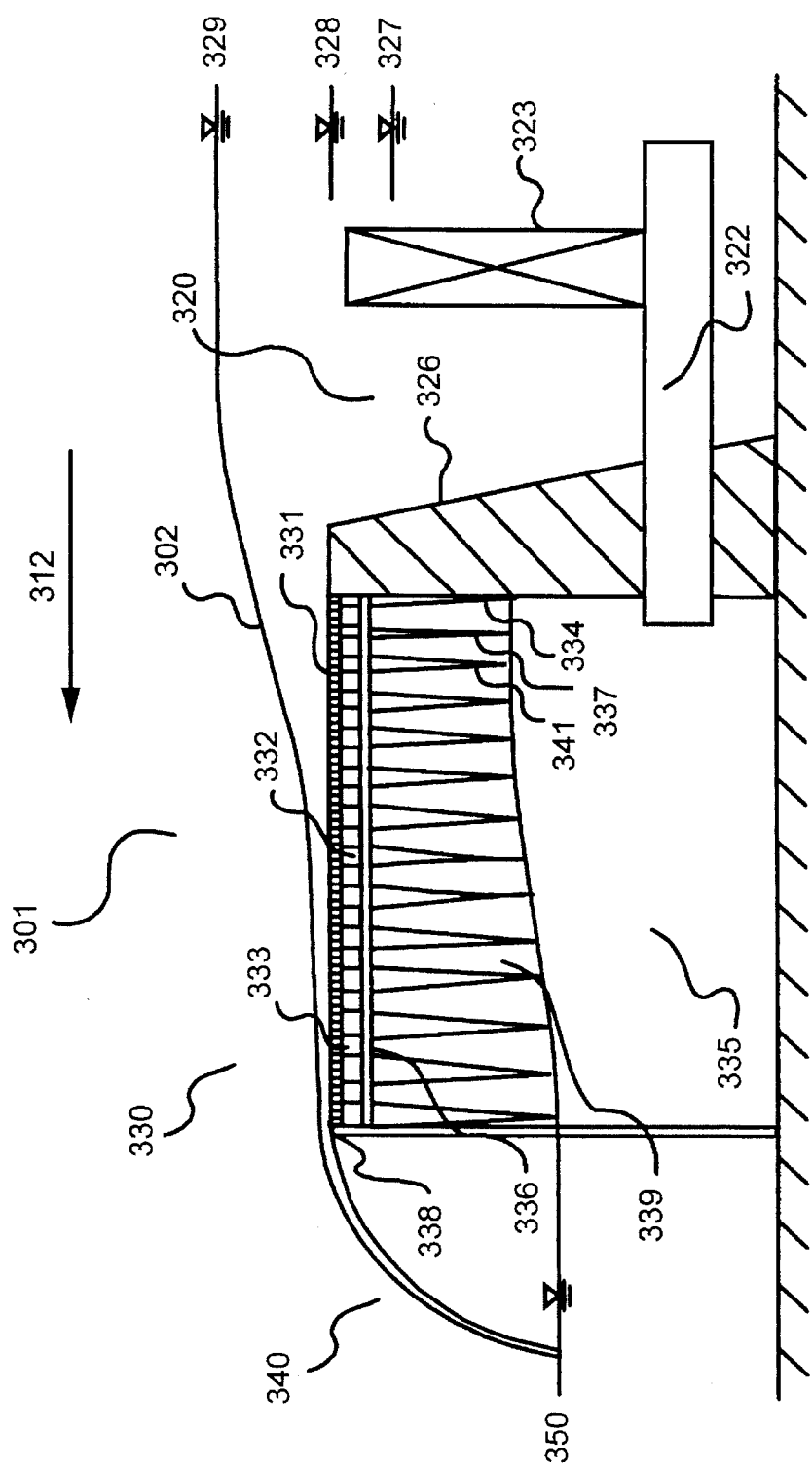
FIG. 3 is a side elevational view of one preferred embodiment of the instant new infuser weir.

Referring now specifically to FIG. 3, in the new infuser weir of the instant invention, generally shown at 301, it will be appreciated that the side elevational view thereof is as it would be viewed by an observer positioned at or near the stream side wall. As shown, passive aeration infuser weir 301 or just infuser is oriented along the river flow, downstream from the hydroproject (not shown). For convenience to the reader, stream flow is generally illustrated by vector 312. In this particular embodiment, weir 301 is shown generally in two sections. Section 320 of weir 301 comprises the regulation means thereof and may be conveniently constructed in some instances in like manner of crib weir (FIG. 1), supra, i.e. of pressure-treated members arranged for as crib cells filled with anchoring material. River water, generally illustrated at elevation 328, upstream of regulation weir face 326, is passed downstream via a minimum flow apparatus comprising pipe 322 and control valve 323. Regulation weir face 326 may be constructed of timber material or concrete material. The size of pipe 322 is based on upstream water level and design discharge rate. Control valve 323 may be mechanically actuated or hydraulically actuated. If an election is made not to install a valve, pipe 322 discharge will be strictly a function of the upstream water level. Downstream from regulation section 320 is infuser section 330 of weir 301, over which river water regulated by section 320 (especially weir portion 326) is caused to flow and simultaneous therewith through which some or all of such water is caused to enter. As may be appreciated, such river water flowing over and/or through infuser section 330 conveniently may first enter grate 331, which grate is designed to improve aeration and prevent footfall. Subsequently, such water then is broken up into a multitude of undivided jets by means of said water entering a number of apertures, one of which is generally illustrated as 332, formed by a number of blockages, spaced one from another, of which blockages one is shown generally at 333. This results in formation of a number of jets or falling curtains, i.e. directed liquid fall, the first of which is generally illustrated at 334. It should be noted that the beam shown as 336 simply supports the ends of the transversely-arranged blockage members, and does not restrict flow in the apertures 332 between the blockages 333. The multitude of jets (curtains) passing through the apertures 331 are grouped in small groups, separated by blockages 333. Blockages 333 also allow air passage between the plurality of jets. The resulting formed jets entrain air in plunging pool 335. As frothy water moves downstream of the jets of water comprising, for example, first falling curtain 334, the jets of water comprising the next falling curtain 337 reentrain the bubbles, and so on. The remaining body of water which is not disposed of through the plurality of apertures such as 332, is disposed of as a free waterfall over the downstream infuser deck lip 338. A typical water surface profile during overflow of weir 301 as is the case, for instance, during and shortly after discharge from turbines in the hydroproject (not shown) upstream therefrom is illustrated at 302, similar to the depiction in FIG. 1, supra. Accordingly, it should be appreciated that under conditions of overflow, a typical water profile could be illustrated as cascading over downstream lip 338 of infuser section 330 wherefrom would result a cascade of water in surplus to that which would normally enter the partially enclosed space of infuser section 330, said partially enclosed space illustrated for convenience at 339; it being appreciated, of course, that entry thereinto is provided by the plurality of apertures or slots normal to such flow such as 332 and wherein are the plurality of falling curtains formed, by the spacings between the plurality of blockages such as 333 arranged normal to such flow.

It is worth noting that terminology herein referencing headwaters and tailwaters can be determinative when modified by particular devices. Accordingly, infuser weir 301 tailwater is also tailwater of the hydroproject (not shown), whereas weir 301 headwater references position upstream of face 326. During normal generation of power in said hydroproject (not shown), water flow upstream of face 326 is conveniently arranged so that preferably most of the water which makes its way over section 326 is dissipated along the longitudinal dimension of infuser section 330 by way of diverting successive portions thereof into the plurality of slots or apertures one of which is referenced supra at 332. Although this arrangement for diverting most, if not all, of such water into such slots is not critical to the instant invention, it is preferred since under such operating conditions the multiplying factor of air reentrainment action thereof is maximized. Weir tailwater elevation for normal hydropower generation conditions may conveniently be illustrated at 350.

For purposes of reference, infuser section 330 of weir 301 can conveniently be referred to as having an upstream or headwater portion which would lie in the general vicinity of the discharging end of conduit 322 and a downstream or tailwater portion which would lie generally in the area beneath infuser deck 330. Although not critical to operation of the instant invention, it has been found highly preferable that the slots provided in infuser section 330 and arranged normal to the general flow of water thereover have widths which vary, one from another, in the longitudinal dimension of infuser section 330, and preferably with the width of such slots, conveniently fixed, of course, by the spacings of blockages 333, incrementally increased in the downstream direction away from face 326 and in the direction of infuser deck lip 338. Other variations of this theme are to keep the slot widths approximately equal in some portion of infuser section 330 beginning at about the headwater portion thereof and varying the width of such slots in and near the tailwater portion thereof. In any event, the net effect of such slots is to divert and direct increments of water flowing over the top of infuser section 330 through grate 331 (optional-but highly desirable) and into such entry ports provided by the multitude of apertures such as 332 and to thereby form a series of falling curtains of water downwardly to the surface of the pool of water shown at 335 maintained near the lower portion of partially enclosed space 339 which is at least partially defined by infuser section 330. The entrainment of air bubbles into such pool and resulting from first curtain 334, are caused to remain submerged in such pool, since before a substantial amount of such entrained air bubbles coalesce and rise to the surface of pool 335 and disassociate they are further reentrained in the flow path formed by such pool and into the vicinity of second falling curtain 337 to thereby break said bubbles into smaller ones and force them back downwardly into the depths of pool 335 along with air bubbles naturally formed by said second curtain. The resulting reentrained bubbles originally associated with the impingement of first falling curtain 334 together with the bubbles entrained by impingement action of second falling curtain 337 with the pool are swept even further downstream thereby simultaneously further acted upon by impingement of third falling curtain 341 and so on with the limitation factor being the number of falling curtains provided in a particular device. Accordingly, it should be appreciated that not only does this arrangement provide for substantially increased residence time, decreased bubble size, due to repeated breaking up of coalesced bubbles, and reentrainment of bubbles but that it exhibits a certain cumulative effect wherein, of course, an individual bubble formed by impingement of an upstream curtain has a statistical life expectancy substantially greater than one formed by a downstream curtain. It should also be appreciated that the directed entry of liquid into any such slot as, for example, 332, to thereby form a resulting directed liquid fall therethrough gives rise to a curtain profile substantially different from that which would result from a free-falling nappe over lip 338 in that such waterfall naturally forms at least at or near the upper portions thereof the typical profile of a waterfall, providing an aesthetic quality to the infuser weir, and serving the purpose of passing trash, fish and other objects downstream of the infuser deck. Constructed waterfall, generally shown at 340 and located at the end of infuser deck, provides for the structure to be to some extent self-cleaning, allowing for passage of items which might otherwise collect on infuser deck or grate 331.

Although the top of infuser section 330 comprising grate 331 and apertures such as 332 formed by spaced apart blockages such as 333, is shown herein as a generally horizontally disposed plane, it is to be understood that the instant invention is not limited to such a configuration, albeit it is perhaps the most easily to construct and install. As noted elsewhere, infuser section 330 top section may be configured differently from that herein shown and indeed several modifications thereof have been modeled. Such modifications include an arrangement wherein such top section, although still generally arranged in a plane, is inclined downwardly from the horizontal so that the beginning portion thereof, i.e. the headwater portion, is at about the elevation of the crest of the vertical weir 326, whereas the ending portion thereof is coincident with weir 301 tailwater, or the ending portion thereof lies somewhere between vertical weir 301 elevation generally coincident with elevation 328 and the illustrated tailwater elevation 350 thereby providing a device over which boats may travel during certain flow conditions. In another embodiment, infuser section 330 top section may be configured differently from that herein shown indicating an arrangement wherein such top section, although still generally arranged in a plane, is inclined upwardly from the horizontal so that the beginning portion thereof is coincident with face section 326, and the ending portion thereof, i.e. the tailwater portion, is at about the elevation generally illustrated at 329 and coincident with weir headwater terminus of first section 320, or the ending portion lies somewhere between weir face 326 elevation and the illustrated headwater elevation 329, thereby improving the fall height of the downstream water curtains and improving the aeration of the device. A still further alternative modification of the top portion for infuser section 330 can conveniently be incorporated in arranging same in a series of plateaus or stages wherein the step-down, as well the step-up mode also proceeds in a direction from infuser 330 headwater portion to the tailwater portion. These last described step-down and step-up embodiments although not lending themselves as conveniently to fabrication as the downwardly sloped and upwardly sloped arrangements, respectively, present an installation profile particularly pleasing to public view and present an added advantage in terms of upstream foot travel thereover. In either of such later described embodiments it will be appreciated that the height of the waterfalls resulting therefrom vary over the longitudinal dimension of the infuser section.

In still another embodiment of the infuser section 330, the pattern of transverse openings and blockages that produce directed curtains of fall may be replaced by a surface with multiple discrete orifices that produce directed columns of fall as the water flowing over the infuser deck is directed into the orifices. Such a perforated surface could be developed by stamping or cutting circular, polygonal, or irregularly shaped perforations into a sheet metal layer. The perforated surface could be supported by grating to produce turbulent columns of fall to improve aeration, with the grating itself supported by widely spaced beams of suitable materials. The perforated surface could also be cast in a concrete slab, with reinforcement so as to support itself, or with the slab supported by suitable beams. In these examples of the perforated surface embodiment of the invention, considerably more surface area of waterfall could be produced than with the transverse slots in the preferred embodiment, with perhaps some loss in ventilation effectiveness between the columns as compared to the curtains.

Figure 4:
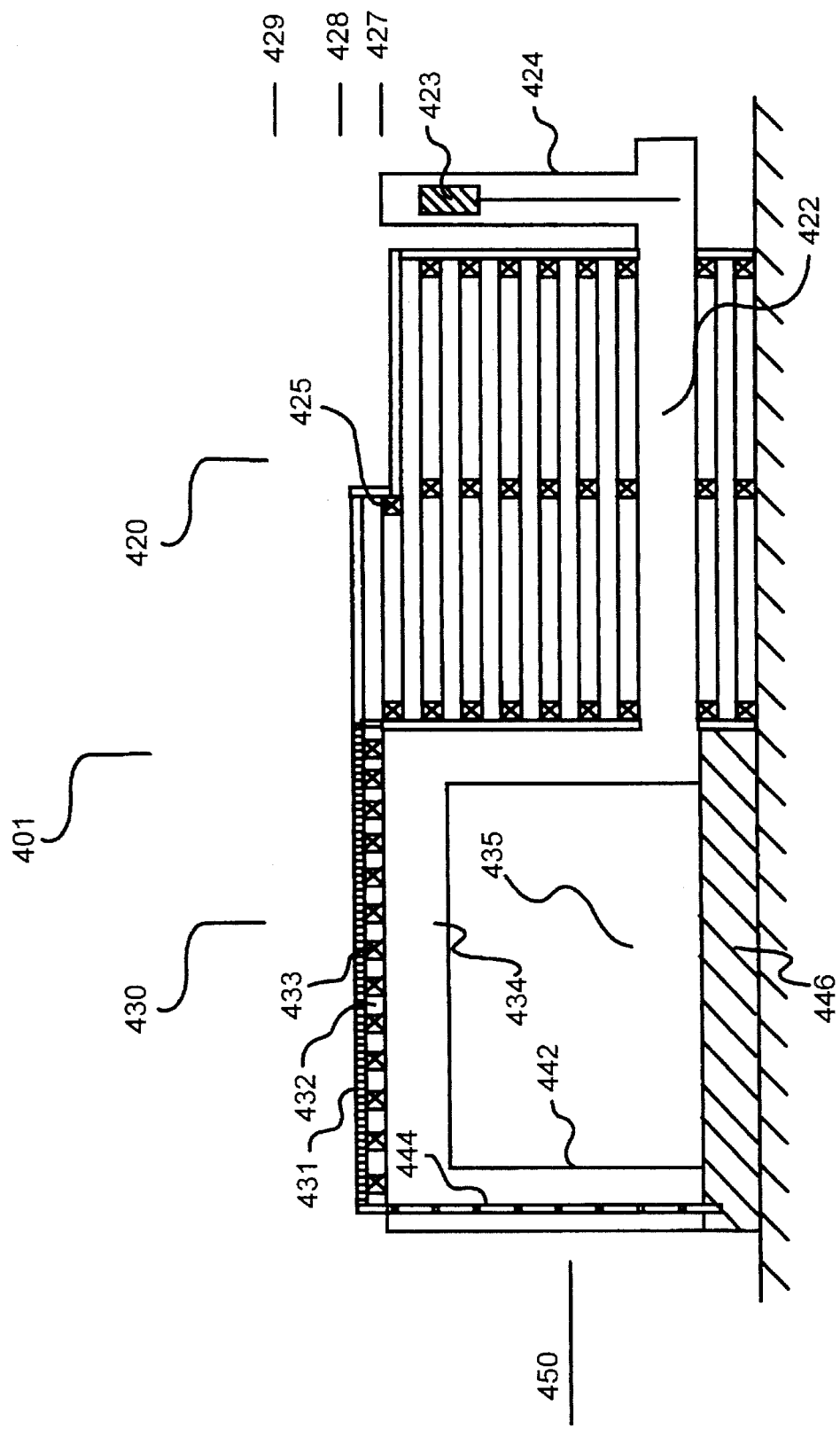
FIG. 4 is a side elevational view of another preferred embodiment of the instant new infuser weir.

Referring now more specifically to FIG. 4, therein is shown an elevational side view, for purposes of convenience and cost effective construction, of one preferred embodiment of the instant device. The preferred embodiment shown in FIG. 4 was constructed below Chatuge hydroproject near Hayesville, N.C. This embodiment of the instant invention can be provided through the efficient and effective utilization of pressure-treated timbers preferably of about 6"×6" cross-section and 12 feet in length. As shown, passive aeration infuser weir generally illustrated at 401 is oriented along the river flow, downstream from the hydroproject (not shown). In this particular embodiment, weir 401 is again shown in two sections. Section 420 comprises the regulation means thereof and may conveniently be constructed in some instances in like manner of crib weir (FIG. 1), supra, i.e., of pressure-treated members arranged for convenient formation of crib cells filled with anchoring material (not shown). River water at any of the elevations conveniently illustrated by 427, 428, and 429 upstream of section 420 or regulation portion of weir 401, is passed downstream thereof via a minimum flow apparatus comprising pipe 422 and float-actuated control valve 423 located within vertical pipe segment 424. Section 420 is constructed of 6"×6" timber material generally illustrated by 425, which spacings are filled with riprap material (not shown). The size of pipe 422 is based on upstream water level and design discharge rate. Downstream from regulation section 420 is infuser section 430 of weir 401, over which river water regulated by section 420 is caused to flow and simultaneous therewith through which some or all of such water is caused to enter a standard safety metal grating 431 provided in the general top surface thereof, as shown. The multitude of the apertures therebetween, one of which is illustrated at 432, separated by blockages as, for example, that illustrated at 433. The blockages are made of 6"×6" timber material such as 433 laid over concrete beams 434 supported by concrete piers as illustrated at 442. Falling water plunge pool 435 is lined with concrete base 446 to eliminate potential scour at channel bottom. Unauthorized entry under the infuser deck is prevented via steel gate 444, and authorized access is through a lockable steel access door through steel gate 444.

During normal generation of power in said hydroproject (not shown), the water surface profile (not shown) over weir 401 is essentially similar to that over weir 301, being dissipated along the longitudinal dimension, i.e., substantially parallel to original stream flow of infuser section 430 by way of diverting successive portions thereof into the plurality of apertures one of which is referenced supra at 432. Weir 401 tailwater elevation for normal hydropower generation conditions may conveniently be illustrated at 450.

It is to be understood, of course, that the use of grating-covered timbers for the blockages in no way effects the gist underlying the concept of the instant invention since the instant invention contemplates other modified forms or embodiments including an arrangement wherein the slots for the top of the infuser section can be conveniently provided by molding of grating materials and translocating same from the point of manufacture to the weir construction situs. It is also understood that although the timbers utilized for building the crib can be of the pressure-treated type, other materials can be substituted therefor including posts, boards, or beams of redwood or cypress, or alternatively manmade materials can be utilized for fabrication of similarly shaped members. Accordingly, the instant invention is not limited by the manner of construction or arrangements specifically described or shown as they may relate to providing entry means into the partially enclosed space defined and referenced as the weir infuser section. Likewise, the upstream weir section of the instant device may be modified in any number of ways, it being understood that its principal function as it relates to the instant invention when utilized in stream tailwater environments is mainly for purposes of impounding hydroproject tailwaters and defining a flow path or flow paths, i.e., regulation to and over the top surface of said infuser section. This will be better appreciated when the reader envisions utilization of the instant device, herein not specifically shown, in the application of aerating sewage sludge or slurries derived, for example, from municipal waste or any other of a number of residential or industrial wastewaters, along with chemical processes including, but not limited to, solvents and oxidizing fluids employed in the manufacturing of electronic devices, polymeric materials, and so on, to thereby provide requisite aeration thereof. In such installations, of course, it is highly unlikely that an impounding section or function would be required, but rather only such means would be needed to ensure proper flow characteristics of such liquids over the particular plurality of apertures arranged in the manner herein described.

Figure 5:
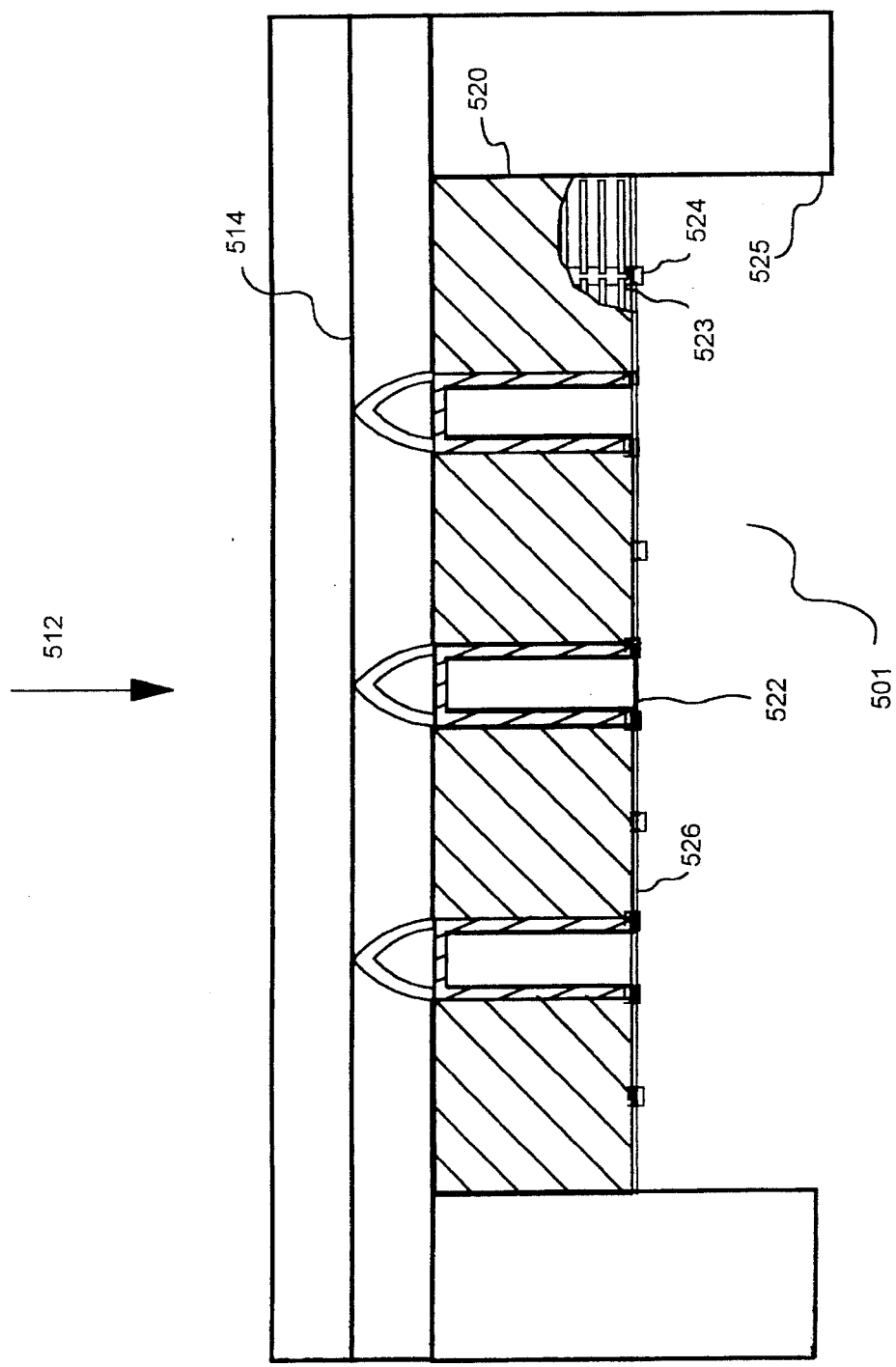
FIG. 5 is a top and fragmentary view of a modular unit of the preferred embodiment shown in FIG. 4 wherein the curtain width portion on the deck of said new infuser device, i.e. normal to stream flow, is conveniently unitized by the dictates of availability of 6"×6" pressure treated timbers in 12-foot lengths, it being noted that the entire 12-foot length is utilized for forming a unit of infuser slots described in greater detail infra, and standard length portions are utilized in the lincoln-log style crib construction of the associated weir and abutments.

Referring now specifically to FIG. 5, therein is shown a top or plane and partially cutaway view of the embodiment for which FIG. 4 is the side view. This plane view showing the weir generally at 501 is shown to illustrate the use and placement of aeration chimneys 522, which are vents or openings from the atmosphere to the area beneath infuser deck generally shown at 520. These chimneys provide means for replenishment of air to the aeration chamber under the deck as air is being entrained into the water by action of the water curtains (not shown) impinging on the plunge pool (not shown). The direction of water flow is shown by vector 512. The impervious weir section or face is shown at 514. The upstream ends of each chimney are streamlined as shown. One of the abutments is shown at 525. Deck 520 is covered with grating, as shown, except in the cutaway portion that reveals the underlying timber blockages as illustrated at 523 and support beam 524. At the downstream end of infuser deck 520, FIG. 5 shows the top of safety cage device 526 that excludes access into the area under the deck.

DESCRIPTION OF THE PREFERRED EMBODIMENTS

As will become apparent from detailed descriptions and illustrations of specifics relating to the design, construction, and technique of operation of the apparatus of the instant invention, as it relates to that preferred embodiment directed to tailwater management, the headwater portion of the instant weir which acts to impound water in the stream or river is most preferably arranged generally normal to stream flow and may conveniently be constructed of any suitable materials ranging from rocks in riprap or cribbed style, with or without provisions of impervious materials applied or juxtaposed therewith, to concrete dams. The longitudinal length of the instant new apparatus from the upstream face thereof to the infuser section may be of any convenient length. The section termed the infuser section extends just below a water retaining wall. The top portion of the infuser section, in the most preferred embodiment thereof, generally defines a horizontal plane, downward inclined plane, or upward inclined plane, i.e., the plane may be horizontal or may be tilted away from the horizontal away or toward the weir tailwater. Alternatively, the plane generally defining the top portion of the infuser section may be provided in step-wise fashion, i.e., in either a step-down fashion, or a step-up fashion, in reference to the weir tailwater. The infuser section top preferably comprises a plurality of apertures, generally in the form of slots more or less parallel to one another and of equal, or in the most preferred embodiment, of variable widths, which widths increase in size toward the longitudinal direction of the weir tailwater. Such apparatus may conveniently be provided by means of placing boards or posts, or more preferably beams spaced apart from one another and arranged latitudinally; i.e., normal to stream flow. Depending on the width of the instant infuser, the effective length of any singular board, beam, or post section can easily be extended by placing a plurality thereof end to end. The relative spacing through any section viewed normal to stream flow of such boards, beams, or posts can be uniform but, as will be described in greater detail infra in a preferred embodiment thereof, the spacing between beams or posts increases longitudinally toward the weir tailwater thereby effecting a plurality of slots wherein the width thereof increases in the downstream direction longitudinally along the infuser section. The spacing may be maintained, of course, by any convenient means such as, for example, nailing, screwing, bolting, or otherwise fixing the individual boards, beams, or posts to supporting runners. If desired, the instant apparatus conveniently may also be provided at or near its downstream terminus with barrier means for preventing ingress of the infuser section by persons, boats, and objects. Somewhat likewise, the headwater portion of the instant device, hereinafter referred to for convenience as the "infuser" may be provided with a means for excluding trash and other unwanted materials from flow over the infuser weir which exclusion means is arranged and disposed in a manner to prevent clogging of the spaces of the infuser section with such trash or other objects. If desired, the device may also be arranged to allow passage of fish downstream over, into, and/or through the device. It will, of course, be appreciated that the instant apparatus, when so utilized in the tailwater weir embodiment rather than in chemical processes applications, oftentimes will be provided with conduit means, with or without flow control means operatively associated therewith, which in one preferred embodiment thereof takes the form of pipes ranging upwards of several feet in diameter disposed through the first section of said weir to provide flow of weir headwater around or through the impermeable portion of the weir and further provided with discharge means arranged so that water may bypass the impounding means of the weir for maintenance and address of tailwater minimum flow considerations. Oftentimes, such conduit means or pipes need not extend beyond a point where there will be no substantial erosive degradation of the weir components which in the form of a cribbed rock arrangement, allows for discharge into the lower portion of the infuser section. In addition, the further provision for flow control as, for example, by use of one or more float actuated or hydraulically actuated valves attached to such conduits, ensures effecting optimum minimum flow operations between refills of such a weir impoundment. Other refinements and modifications as desired may be constructed with or separate from such a tailwater weir arrangement including additional barrier devices, etc.

Another and important consideration that has come to light in later investigations into the fabrication of such infuser section, is that such infuser section may be constructed in modular sections at a situs removed from the intended weir situs and later transported and installed thereat. The significance of this embodiment will be appreciated when it is realized that the top of the infuser section could be conveniently molded or otherwise fabricated in a grate like fashion and effectively utilized for aeration, not only in a hydroproject tailwater environment, but also in chemical and industrial applications requiring aerated water, solvents, or other reagents, thereby resulting in installations of significantly decreased capital costs and vastly enhanced aerating responses. Indeed, preliminary investigations have sparked a high degree of enthusiasm among major contributors to the instant invention upon the realization that they have developed a device which not only meets or surpasses the desired objectives for tailwater management/aeration but which may ultimately prove to have impact in satisfying other environmental concerns (by its widespread utilization in water and sewage treatment facilities); and industrial applications (by its use in providing low cost, yet efficient, aeration systems).

The slots provided in the infuser are arranged normal to the general flow, thus water flow over the top of the infuser section forms a series of falling curtains of water downwardly to the surface of the pool of water maintained near the lower portion of that partially enclosed space, which is at least partially defined by the infuser. The entrainment of air bubbles into such pool and resulting from the very first curtain are caused to remain submerged in such pool, since before a substantial amount of such entrained air bubbles coalesce and rise to the surface of the pool, they are further reentrained as they are carried in the flow path formed by such pool into the vicinity of the second in the series of falling curtains, thereby breaking the bubbles into smaller ones (that aerate better than large, coalesced bubbles) and forcing said bubbles back downwardly into the depth of the pool along, of course, with air bubbles formed by said second curtain. The resulting reentrained bubbles originally associated with the impingement of the first falling curtain together with the bubbles broken and reentrained by impingement action of the second falling curtain with the pool are swept even further downstream thereby to be subsequently simultaneously acted upon by impingement of the third falling curtain and so on through the action of the fourth, fifth and the remaining number of falling curtains provided in a particular device. Accordingly, it should be appreciated that not only does this arrangement provide for substantially increased residence time, turbulent shearing, and reentrainment of bubbles but that it has and exhibits a certain cumulative effect wherein, of course, any particular individual bubble formed by impingement of an upstream curtain has a statistical life expectancy substantially greater than any bubble formed by a downstream disposed curtain. It should also be appreciated that the directed entry of liquid into any such aperture, grated, or slot to thereby form a resulting directed liquid fall therethrough gives rise to an irregular and turbulent curtain profile substantially different from that which would result from a laminar free-falling waterfall over the top or lip of a typical prior art weir.

Although a horizontally disposed infuser is perhaps the easiest to construct and install, the infuser section, or infuser, may be configured differently from that herein described including an arrangement wherein the infuser top section although still generally arranged in a plane is inclined downwardly or upwardly in reference to the tailwater. A downward inclined infuser may allow navigability by small boats, whereas an upwardly inclined infuser would increase the water free fall at the downstream end of the infuser deck, thus improving the aerating performance of the instant device. A still further alternative modification for the infuser can conveniently be provided by arranging same in a series of plateaus, or steps wherein the step-down mode, or the step-up mode, also precedes in a direction from the headwater portion to the tailwater portion. This last described embodiment presents a scenic water fall profile. In either of such later described embodiments, it will be appreciated that the height of the series of waterfalls resulting therefrom may vary over all, or at least a portion of the longitudinal dimension of the infuser.

Infuser aeration requires adequate ventilation to the areas between the water curtains beneath the infuser deck. Aeration is improved if vertical vents, or aeration chimneys, are provided to allow a means for air to enter from the atmosphere to the aeration chamber beneath the infuser top. These chimneys are best placed at intervals atop the infuser deck, as shown in FIG. 5, and at the sides of the infuser deck where they must be built as vents in the weir abutments. The aeration chimneys shorten the travel distance and reduce the number of turns and angles necessary for air flow to eventually get between the curtains. These chimneys are especially important if the number of slots and blockages is large in the infuser deck, and if water flow is allowed over the downstream lip of the infuser deck. Both of these latter characteristics inhibit easy access of air to the aeration chamber beneath the infuser deck, and the aeration chimneys restore a short airflow path to increase aeration performance.

EXAMPLES

In order that those skilled in the art may better understand how the present invention can be used in practice, the following examples are given by way of illustration only, and are not intended for the purposes of indicating limitations and/or restrictions on the breadth and/or scope encompassed by the various embodiments of said invention, including, but not necessarily limited to, the embodiments illustrated herein since certain practicalities have been limiting factors for purposes of this presentation.

EXAMPLE I

For purposes of this example an aerating infuser weir of the design generally herein described was simulated with a small scale infuser section utilizing the assignee's Norris, Tenn. The flume model was a 1:6 scale model of a various alternatives for possible application at Chatuge hydroproject near Hayesville, N.C. The shape and density of the generated bubbles, along with the infuser surface hydraulics and tailwater hydraulic conditions were qualitatively examined in search of the most dense bubble zone with a benign hydraulic profile; e.g., the desired absence of a hydraulic jump in the tailwater. The infuser model was 4 feet in width, 1.5 feet in height, and varying in length from 4 feet to 12 feet; simulating a prototype 100 feet in width, 8 feet in height, and varying in length from 22 feet to 64 feet. The specific discharge over the infuser was about 1 cfs/ft, simulating a prototype flow of about 12.3 cfs/ft (note cfs/ft indicate cubic feet per second per linear foot of infuser width). The infuser deck was simulated using plastic diffusers with opening size being ½ inch square. The blockages over the infuser were simulated using plastic tape placed on top of the diffuser in various arrangements. Various infuser configurations were tested including, but not limited to the preferred embodiment of a horizontal infuser deck with blockages located normal to the waterflow orientation with the spacings between the blockages being uniform, blockages normal to waterflow with increasing spacings in the downstream direction, and blockages parallel to the waterflow direction. Similar blockage patterns were tested on a step-down infuser, with different step-sizes; as well as an infuser inclined downwardly in the downstream orientation. The downwardly inclined infuser designs and the step-down infuser designs were observed to manifest a light bubble zone, with a hydraulic jump condition when the downstream end of the infuser is submerged by the tailwater. The flat infuser, with longitudinal blockages, i.e., the blockages, of uniform thickness being located along the water flow orientation with the sizes of the openings being about 2 inches; manifested a light bubble zone with the flowing water exhibiting an overshoot over the length of the infuser which is also the length of the blockages. The preferred embodiment, a flat infuser with uniform size blockages normal to flow and with openings increasing in size in the downstream direction, was chosen for further study among the tested designs since it generated a large and dense bubble zone; hydraulic jumps or other unsafe conditions were not observed in the tailwater; and the design is relatively simple and economical to construct.

EXAMPLE II

For purposes of this example and extrapolating data obtained through tests, some of which are reported in Example I, supra, laboratory tests of a near full scale aerating infuser were conducted to help design a prototype for the Chatuge hydroproject. Revisiting aeration theory, dissolved oxygen uptake across a straight weir is dictated by the amount of air entrained by the free fall water, and the residence time of the air bubbles entrained under water. A labyrinth weir differs from such a straight weir in that some of the bubbles are reentrained as water moves downstream, with an additional approximately 20% increase in aeration efficiency along the length of the labyrinth legs.

In general, dissolved oxygen gain across a free fall structure is optimum with a high velocity nappe, a large perimeter to cross-sectional area aspect ratio, maximum air supply, small size bubbles, and maximum bubble residence time. Due to safety and cost constraints, only some of the above criteria are usually met.

The instant aerating infuser was designed to address the above mentioned technical, safety, and financial concerns. As shown and described in conjunction with FIGS. 3 and 4, supra, the instant aerating infuser consists of a series of openings separated by blocked areas. The entire deck is covered by grating. The optimum design is a function of the size, both width and depth, of each opening, and the size of the blockages between the openings. It has been observed that the falling curtains entrain some air about the grate as well as in the resulting plunge pool impingement. This phenomenon improves the aerating performance of the structure. Several grate sizes, openings, and blockage lengths have been tested. The instant infuser grate has been observed to break up the impinging nappe into one with a large perimeter to cross sectional area aspect ratio, while still maintaining a high slot discharge velocity due to the water head above the infuser. The openings are designed such that each opening specific discharge rate is nearly 0.67 cfs/ft. This corresponds to the literature-reported optimum discharge rate for aeration over a free falling weir. The water fall in the openings creates low pressure regions under the blockages. Air is drawn along under the blockages.

For an appreciation of the aerating characteristics of this device and its enhancement capabilities under various hydroproject tailwater conditions, near full scale tests of various horizontal deck options for the Chatuge proposed infuser were conducted by the authors of the instant invention at the TVA Engineering Laboratory. The aerating performance of several infuser configurations were evaluated, and the infuser aerating efficiency were determined for these different configurations. The results for various configurations tested with steel grating are provided in Table 1, below. Aeration efficiencies are given as percentages of the oxygen deficit below saturation that is removed by the aeration action of the weir. As can be deduced from Table 1, aeration efficiency changes with drop height, specific discharge, and wetted infuser length. For drop height of around 4 feet and tailwater depths around 3 feet, the best infuser aerating efficiencies occur for q/L around 0.65 cfs/ft$^2$.

TABLE 1

| test | # openings (slots) apertures per slot | | | | | | | | | # jets | blk-age size b (ft) | deck open lngth lo (ft) | fract deck open fo | hw-tw drop height h (ft) |
|------|---|---|---|---|---|---|---|---|---|---|---|---|---|---|
|      | 1 | 2 | 3 | 4 | 6 | 8 | 9 | 10 | 130 | | | | | |
| 1.16 | 0 | 1 | 0 | 3 | 6 | 0 | 0 | 5 | 0 | 14.8 | 1 | 8.17 | 0.355 | 4.13 |
| 2.1  | 4 | 8 | 12| 1 | 0 | 0 | 0 | 0 | 0 | 25.3 | 1 | 5.08 | 0.164 | 4.13 |
| 2.3  | 4 | 8 | 12| 0 | 0 | 0 | 0 | 0 | 0 | 23.8 | 1 | 4.62 | 0.165 | 4.05 |
| 2.2  | 4 | 8 | 9 | 0 | 0 | 0 | 0 | 0 | 0 | 20.7 | 1 | 3.84 | 0.16  | 3.63 |
| 4.1  | 0 | 1 | 0 | 3 | 6 | 0 | 0 | 6 | 0 | 16.1 | 0.5 | 9.25 | 0.514 | 4.08 |
| 4.2  | 0 | 1 | 0 | 3 | 6 | 0 | 0 | 6 | 0 | 16.1 | 0.5 | 9.25 | 0.514 | 3.08 |
| 4.3  | 0 | 1 | 0 | 3 | 6 | 0 | 0 | 2 | 0 | 12   | 0.5 | 5.79 | 0.483 | 3.9  |
| 5.1  | 0 | 0 | 0 | 0 | 0 | 0 | 0 | 0 | 0.98 | 0.98 | 0 | 10.6 | 0.885 | 4.11 |
| 8.1  | 0 | 1 | 0 | 3 | 0 | 0 | 0 | 0 | 0.72 | 4.72 | 0.5 | 8.97 | 0.747 | 4.1 |
| 1.13 | 0 | 1 | 0 | 3 | 6 | 0 | 0 | 5 | 0 | 14.8 | 1 | 8.17 | 0.355 | 4.17 |
| 1.14 | 0 | 1 | 0 | 3 | 6 | 0 | 0 | 3 | 0 | 13.3 | 1 | 6.88 | 0.344 | 4.05 |
| 1.15 | 0 | 1 | 0 | 3 | 6 | 0 | 0 | 1 | 0 | 11.2 | 1 | 5.17 | 0.323 | 3.64 |
| 11.1 | 0 | 1 | 0 | 3 | 6 | 2 | 2 | 0 | 0 | 13.7 | 0.5 | 6.78 | 0.484 | 4.09 |
| 12.1 | 0 | 1 | 0 | 3 | 2 | 2 | 1 | 4 | 0 | 12.6 | 0.5 | 7.25 | 0.518 | 4.1 |
| 13.1 | 0 | 1 | 0 | 3 | 6 | 0 | 0 | 3 | 0 | 13.3 | 0.5 | 6.92 | 0.494 | 4.1 |
| 14.1 | 0 | 1 | 0 | 3 | 2 | 0 | 1 | 5 | 0 | 12.4 | 0.5 | 7.38 | 0.527 | 4.1 |
| proto| 0 | 1 | 0 | 3 | 6 | 0 | 0 | 3 | 0 | 13.3 | 0.5 | 6.92 | 0.494 | 6.97 |
| proto| 0 | 1 | 0 | 3 | 6 | 0 | 0 | 3 | 0 | 13.3 | 0.5 | 6.92 | 0.494 | 6.97 |
| proto| 0 | 1 | 0 | 3 | 6 | 0 | 0 | 3 | 0 | 13.3 | 0.5 | 6.92 | 0.494 | 6.37 |
| proto| 0 | 1 | 0 | 3 | 6 | 0 | 0 | 3 | 0 | 13.3 | 0.5 | 6.92 | 0.494 | 6.97 |
| proto| 0 | 1 | 0 | 3 | 6 | 0 | 0 | 3 | 0 | 13.3 | 0.5 | 6.92 | 0.494 | 6.77 |
| proto| 0 | 1 | 0 | 3 | 6 | 0 | 0 | 3 | 0 | 13.3 | 0.5 | 6.92 | 0.494 | 8.17 |
| proto| 0 | 1 | 0 | 3 | 6 | 0 | 0 | 3 | 0 | 13.3 | 0.5 | 6.92 | 0.494 | 6.77 |

| test | free fall ht ff (ft) | head on weir hcrst (ft) | infuser length (wet) L (ft) | spec. flow q (cfs/ft) | mean q/jet q/jet (cfs/ft) | tw depth ytw (ft) | deck flux q/L (cfs/ft2) | aeration efficiency at 15 C $E_{15}$ % |
|------|---|---|---|---|---|---|---|---|
| 1.16 | 2 | 2.13 | 23 | 10.8 | 0.74  | 3 | 0.47  | 57.5 |
| 2.1  | 2 | 2.13 | 31 | 10.8 | 0.74  | 3 | 0.348 | 38.3 |
| 2.3  | 2 | 2.05 | 28 | 8.9  | 0.61  | 3 | 0.318 | 33.9 |
| 2.2  | 2 | 1.63 | 24 | 6.7  | 0.459 | 3 | 0.279 | 36.8 |
| 4.1  | 2 | 2.08 | 18 | 10.8 | 0.74  | 3 | 0.6   | 55.7 |
| 4.2  | 1 | 2.08 | 18 | 10.8 | 0.74  | 4 | 0.6   | 42.5 |
| 4.3  | 2 | 1.9  | 12 | 8.9  | 0.61  | 3 | 0.742 | 56.6 |
| 5.1  | 2 | 2.11 | 12 | 10.8 | 0.74  | 3 | 0.9   | 50.5 |
| 8.1  | 2 | 2.1  | 12 | 10.8 | 0.74  | 3 | 0.9   | 43.1 |
| 1.13 | 2 | 2.17 | 23 | 10.8 | 0.74  | 3 | 0.47  | 51.3 |
| 1.14 | 2 | 2.05 | 20 | 8.9  | 0.61  | 3 | 0.445 | 52.4 |

TABLE 1-continued

| 1.15  | 2   | 1.64 | 16 | 6.7  | 0.459 | 3   | 0.419 | 50.5 |
|-------|-----|------|----|------|-------|-----|-------|------|
| 11.1  | 2   | 2.09 | 14 | 10.8 | 0.74  | 3   | 0.771 | 52.8 |
| 12.1  | 2   | 2.1  | 14 | 10.8 | 0.74  | 3   | 0.771 | 53.3 |
| 13.1  | 2   | 2.1  | 14 | 10.8 | 0.74  | 3   | 0.771 | 54.7 |
| 14.1  | 2   | 2.1  | 14 | 10.8 | 0.74  | 3   | 0.771 | 45.3 |
| proto | 4.5 | 2.47 | 14 | 11.6 | 0.795 | 6   | 0.829 | 76.2 |
| proto | 4.5 | 2.47 | 14 | 11.6 | 0.795 | 6   | 0.829 | 79.5 |
| proto | 3.6 | 2.77 | 14 | 14.7 | 1.007 | 6.9 | 1.05  | 75.2 |
| proto | 4.5 | 2.47 | 14 | 11.6 | 0.795 | 6   | 0.829 | 79.5 |
| proto | 4.6 | 2.17 | 14 | 9.1  | 0.623 | 5.9 | 0.65  | 69.9 |
| proto | 6.7 | 1.47 | 11 | 4.6  | 0.315 | 3.8 | 0.418 | 71.8 |
| proto | 4.7 | 2.12 | 14 | 9.3  | 0.637 | 6.9 | 0.664 | 75.6 |

EXAMPLE III

In this example, an infuser weir of the type of the instant invention was modeled after that described in Example II, supra, except that the top surface thereof was provided with a slope from the horizontal in the range of a rise over run ratio of 1:8 and 1:12. Various sloped deck options were laboratory tested. The aeration efficiencies of each of the inclined designs are summarized in Table 2, below. As can be readily observed, increasing the rise to run ratio of the infuser deck, while maintaining all other variables constant, improved the aerating efficiency by over 40%. The upwardly inclined infuser, although is an efficient aerator, is more costly to construct than the preferred embodiment. In addition, at flow rates lower than the design flow, trash and fish passing over the infuser deck are more likely to collect on the deck than with a horizontal infuser. More frequent maintenance would be required. The decision as to whether to construct the preferred embodiment or an upwardly inclined infuser most likely would be based on a compromise between the improved aeration and the construction and maintenance costs.

TABLE 2

| test  | deck slope xx (1:xx) | hw-tw drop height h (ft) | tw depth ytw (ft) | aeration efficiency at 15 C $E_{15}$ % |
|-------|------|------|------|------|
| hsf1  | 0    | 5.6  | 2    | 54.7 |
| hsf2  | 0    | 5.3  | 2.3  | 46.6 |
| hsf3  | 0    | 4.45 | 3.15 | 41.5 |
| hsf4  | 0    | 4.1  | 3.5  | 41.3 |
| hs121 | 12   | 5.65 | 2    | 70.2 |
| hs122 | 12   | 5.15 | 2.5  | 64.8 |
| hs123 | 12   | 4.55 | 3.1  | 61.7 |
| hs124 | 12   | 4.35 | 2    | 59.2 |
| hs81  | 8    | 5.85 | 1.8  | 70.2 |
| hs82  | 8    | 4.75 | 2.9  | 65   |
| hs83  | 8    | 4.35 | 3.3  | 57.8 |
| hs84  | 8    | 3.65 | 2    | 49   |

EXAMPLE IV

In this example, a full-scale prototype aerating infuser is described. This prototype was designed and constructed about 0.7 miles downstream from Chatuge hydroproject on the Hiwassee River near Hayesville, N.C., using and extrapolating data obtained through lab tests, some of which are reported in Examples I and II, supra. The weir was constructed essentially as shown in FIGS. 4 and 5, with a horizontal infuser deck attached to the downstream side of a timber crib weir, which is lined on the upstream face with tongue and groove timbers. The infuser deck is constructed of 6" by 6" timbers oriented normal to flow, overlain with steel grating. The infuser deck is supported by cast-in-place reinforced concrete columns and beams. This weir is about 10 ft high constructed in a 115 ft wide channel. The transverse overflow width of the infuser is 100 ft, in four bays of 25 ft width each between the three ventilation chimneys constructed atop the deck. The infuser deck section is 14 ft long (upstream to downstream dimension) and the timber crib weir is 12 ft long (upstream to downstream dimension). The total headwater to tailwater drop across the weir (normal operating range) is 6 to 7 ft compared to 3 to 4 ft in the lab tests in Example II, supra and specific discharge ranges from 11 to 15 cfs/ft compared to 6 to 11 cfs/ft in the lab tests. Tailwater depths are 6 to 7 ft in the prototype compared to 3 to 4 ft in the lab tests. In field tests, measured aeration efficiencies at this prototype infuser weir exceeded 70% during turbine generation at Chatuge Dam. These measurements are included at the bottom of Table 1, supra (converted to 15 C. temperature) along with the lab test results for similar infuser configurations. This high aeration efficiency means that during severe low DO periods if the incoming DO at the weir is 1 mg/L and saturation is 9 mg/L, weir aeration will overcome 70% of the 8 mg/L deficit, causing an increase of about 5.6 mg/L DO at the weir.

INVENTION PARAMETERS

After sifting and winnowing through the data supra, as well as other results and operations of our new, novel, and improved technique, including methods and means for the effecting thereof, the operating variables, including the acceptable and preferred conditions for carrying out the instant invention are summarized below:

| Operating Variable | Acceptable Limits | Preferred Limits | Most Preferred Limits |
|---|---|---|---|
| specific discharge (q) | 1–100 cfs/ft | 3–50 cfs/ft | 6–35 cfs/ft |
| drop height (h) headwater to tailwater | 1–20 ft | 3–12 ft | 4–8 ft |
| wetted deck length (L) upstream to downstream dimension | 1–100 ft | 5–40 ft | as short as possible to minimize cost until bubbles penetrate just to bottom of channel at design flow |
| free fall height (ff) upstream end of weir | flat 1–15 ft | 2–8 ft | 2–8 ft, and high enough that plunge pool bubbles do not touch deck |
| | sloped 0–15 ft | 0.5–8 ft | 2–8 ft, and high enough that plunge |

-continued

| Operating Variable | Acceptable Limits | Preferred Limits | Most Preferred Limits |
|---|---|---|---|
| tailwater depth ($y_{tw}$) | 1–50 ft | 2–20 ft | pool bubbles do not touch deck bubble penetration depth, $y_b$ according to equation (3) for $y_b$ = function (qh/L) (preliminary empirical relation) |
| blockage width (b) | 0 to 5 ft | 0.3–1.0 ft | 0.1–0.5 times bubble penetration depth ($y_b$) |
| slot opening size | 0.04–5 ft | 0.08–2 ft | 0.16–1 ft, increasing in size in downstream direction to yield similar flow through each opening as head on opening diminishes |
| deck flux (q/L) | 0.1–10 cfS/ft² | 0.3–2 cfS/ft² | Best flux for aeration varies with $y_{tw}$ and h, but a flux of 0.65 cfS/ft₂ is best for $y_{tw}$ = 4 ft and h = 4 ft |

Utilizing the results of the data leading to the invention parameters, supra, along with input of parameters relating to the morphology of some more typical methodic biological systems, an empirical relationship has been devised for mathematically expressing the performance characteristics of the instant new infuser device and system, it being realized, of course, that a certain degree of common sense, applicable to those skilled in this particular art, should be used to temper attempts to push such relationship beyond the bounds applicable to, and often encountered in existing chemical processes and water treatment plants, or by the morphology of river basins capable of supporting hydroelectric projects of the type which necessitate tailwater management as herein described. Accordingly, the performance characteristics of the instant new weir, within the ranges of experiments in Table 1, may be approximated by the following mathematical expressions:

$$E_{15} = \frac{C_d - C_u}{C_s - C_u} = 1 - e^{-u} \qquad (1)$$

where:

u is a linear regression with correlation coefficient=0.98 and standard error-0.07

$$u = 0.5983 + 0.3067 y_{b_{eff}} - 0.3412 \frac{q}{L} - 0.0499 q \qquad (2)$$

$$y_{b_{eff}} = y_b \text{ for } y_b < y_{tw}$$
$$y_{b_{eff}} = y_{tw} \text{ for } y_b > y_{tw}$$

$$y_b = 0.7739 + 2.899 \ln\left(\frac{qh}{L}\right) \qquad (3)$$

where:

$E_{15}$=oxygen transfer efficiency (fraction of oxygen deficit) at 15C for horizontal infuser with transverse openings overlain with steel grating $C_d$=downstream dissolved oxygen concentration (mg/L)

$C_u$=upstream dissolved oxygen concentration (mg/L)

$C_s$=saturation oxygen concentration at 15C (mg/L)

$Y_{b_{eff}}$=effective bubble penetration depth (ft)

$Y_b$=mean bubble penetration depth in unlimited tailwater (ft)

$Y_{tw}$=tailwater depth (ft)

q=specific discharge (cfs/ft)

L=wetted length (upstream to downstream dimension) of infuser deck (ft)

h=drop height (ft) from headwater to tailwater.

This equation could be used in the ranges of q, h, L, q/L, and qh/L, Table 1.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. An improved method for effecting gas to liquid transfer, including increasing the dissolved content of water by selectively interfacing said water with air, said improved method comprising:

(a) defining a partially enclosed space provided with means for receiving gas and further provided with means for receiving about the top portion thereof liquid;

(b) establishing at least one first flow path for substantial volumes of liquid to move over at least a portion of said top of said partially enclosed space;

(c) continuously introducing at least a portion of the liquid flowing over said top of said partially enclosed space, into said partially enclosed space, in the form of a plurality of falling curtains, said curtains generally parallel to one another and generally normal to the flow of liquid over said top of said partially enclosed space;

(d) defining liquid collection means at a lower portion in said partially enclosed space for recombining the liquid in said plurality of falling curtains into a second flow path arranged generally parallel and in substantially the same direction as said first flow path, said second flow path having an upstream portion and a downstream portion wherein entrainment of bubbles in said second flow path resulting from impingement thereon by each falling curtain comprising the plurality thereof is protracted as said flow path is subsequently subjected to additional impingement of flow curtains in the direction of the downstream portion thereof; and (e) continuously passing liquid having resulting substantial reentrainment of gas bubbles therein from said partially enclosed space;

whereby such protracted reentrainment effects substantial increases in the effective residence time of gas-liquid interfacing and concomitant gas phase to liquid phase transfer.

2. The method of claim 1, wherein at least three of said falling curtains impinging said second flow path juxtaposed the downstream portion thereof are formed by slots having widths which vary one from the other and in increments increasing in the direction of said second flow path.

3. The method of claim 1, wherein the height of each of said falling curtains is maintained substantially equal.

4. The method of claim 1, wherein the height of each of said falling curtains is maintained in increments decreasing in the direction of the downstream portion of said second flow path.

5. The method of claim 1, wherein the height of each of said falling curtains is maintained in increments increasing in the direction of the downstream portion of said second flow path.

6. The method of claim 1, wherein the height of a first group of falling curtains juxtaposed the upstream portion of said second flow path is maintained greater than the height of at least one additional group of falling curtains located downstream therefrom.

7. The method of claim 6, wherein a plurality of additional groups of falling curtains is maintained with heights of each group in increments decreasing in the direction of said downstream portion of said second flow path.

8. The method of claim 1, wherein said first flow path of liquid over the top of said partially enclosed space is arranged to provide, in at least one of said resulting falling curtains, discontinuities along the length t hereof normal to said first flow path.

9. The method of claim 1, wherein the liquid utilized to establish said at least one first flow path is wastewater including sewage sludge, sewage slurry, treatment effluent, or mixtures thereof.

10. The method of claim 1, wherein the liquid utilized to establish said at least one first flow path is hydroelectric power project tailwater.

11. The method of claim 10, wherein said tailwater is impounded prior to utilization for establishing said at least one flow path.

12. The method of claim 10, wherein the hydraulic characteristics thereof as they relate to enhanced gas to liquid transfer including increasing dissolved oxygen content of water interfaced with air can be represented as follows:

$$E_{15} = \frac{C_d - C_u}{C_s - C_u} = 1 - e^{-u} \quad (1)$$

where:

u is a linear regression with correlation coefficient=0.98 and standard error −0.07

$$u = 0.5983 + 0.3067 y_{b_{eff}} - 0.3412 \frac{q}{L} - 0.0499 q \quad (2)$$

$$y_{b_{eff}} = y_b \text{ for } y_b < y_{tw}$$

-continued $$y_{b_{eff}} = y_{tw} \text{ for } y_b > y_{tw}$$

$$y_b = 0.7739 + 2.899 \ln\left(\frac{qh}{L}\right) \quad (3)$$

where:

$E_{15}$=oxygen transfer efficiency (fraction of oxygen deficit) at 15C for horizontal infuser with transverse openings overlain with steel grating $C_d$=downstream dissolved oxygen concentration (mg/L)

$C_u$=upstream dissolved oxygen concentration (mg/L)

$C_s$=saturation oxygen concentration at 15C (mg/L)

$Y_{b_{eff}}$=effective bubble penetration depth (ft)

$Y_b$=mean bubble penetration depth in unlimited tailwater (ft)

$Y_{tw}$=tailwater depth (ft)

q=specific discharge (cfs/ft)

L=wetted length (upstream to downstream dimension) of infuser deck (ft)

h=drop height (ft) from headwater to tailwater.

13. The method of claim 12, wherein (q) ranges from about 6 to about 15 cfs/ft; wherein (h) ranges from about 4 to about 8 ft; wherein (L) ranges from about 10 to about 30 ft; wherein qh/L varies from about 1 to about 7; and, wherein (ff) ranges from about 1 to about 5 ft.

14. The method of claim 13, wherein the deck flux (q/L) ranges from about 3 cfs/ft² to about 1 cfs/ft².

15. The method of claim 14, wherein the ratio of bubble penetration depth in unlimited tailwater depth to tailwater depth ($Y_b:y_{tw}$) ranges from about 0.3:1 to about 1.5:1.

16. The method of claim 15, wherein b ranges from about 0.1 ($Y_b$) to about 0.5 ($Y_b$).

17. The method of claim 16, wherein the slot opening size ranges from about 0.1 to about 2 ft.

* * * * *